(12) United States Patent
Glasson

(10) Patent No.: US 6,694,861 B2
(45) Date of Patent: *Feb. 24, 2004

(54) PRECISION SENSOR FOR A HYDRAULIC CYLINDER

(75) Inventor: Richard O. Glasson, Whippany, NJ (US)

(73) Assignee: Control Products Inc., East Hanover, NJ (US)

( * ) Notice: Subject to any disclaimer, the term of this patent is extended or adjusted under 35 U.S.C. 154(b) by 17 days.

This patent is subject to a terminal disclaimer.

(21) Appl. No.: 09/793,218

(22) Filed: Feb. 26, 2001

(65) Prior Publication Data

US 2001/0018861 A1 Sep. 6, 2001

Related U.S. Application Data

(63) Continuation-in-part of application No. 09/302,701, filed on Apr. 30, 1999, now Pat. No. 6,234,061.
(60) Provisional application No. 60/104,886, filed on Oct. 20, 1998.

(51) Int. Cl.[7] .................................................. F01B 31/12
(52) U.S. Cl. ........................................ 92/5 R; 33/763
(58) Field of Search ...................... 91/1; 92/5 R; 33/756, 33/759, 761, 762, 763, 1 PT; 74/DIG. 7

(56) References Cited

U.S. PATENT DOCUMENTS

| | | | |
|---|---|---|---|
| 3,403,365 A | * | 9/1968 | Richards ...................... 92/5 R |
| 4,121,504 A | | 10/1978 | Nowak ........................ 92/5 R |
| 4,231,700 A | | 11/1980 | Studebaker |
| 4,286,386 A | | 9/1981 | Long ............................. 33/759 |
| 4,288,196 A | | 9/1981 | Sutton, II |
| 4,319,864 A | | 3/1982 | Kaufeldt |
| 4,386,552 A | | 6/1983 | Foxwell ........................ 92/5 R |
| 4,480,151 A | | 10/1984 | Dozier |
| 4,945,221 A | | 7/1990 | Nielsen et al. |
| 4,989,329 A | | 2/1991 | Pullen |
| 5,024,250 A | | 6/1991 | Nakamura .................... 92/5 R |
| 5,046,243 A | | 9/1991 | Walker |
| 5,203,723 A | | 4/1993 | Ritter |
| 5,341,724 A | | 8/1994 | Vatel ............................ 92/5 R |
| 5,404,661 A | | 4/1995 | Sahm et al. |
| 5,694,042 A | | 12/1997 | Eaton et al. |
| 5,701,793 A | | 12/1997 | Gardner et al. |
| 5,752,811 A | | 5/1998 | Petro |
| 6,234,061 B1 | * | 5/2001 | Glasson ....................... 92/5 R |

FOREIGN PATENT DOCUMENTS

| | | |
|---|---|---|
| DE | 2635614 | 2/1978 |
| DE | 3835782 | 4/1990 |
| EP | 0325787 | 8/1989 |
| EP | 0505297 | 9/1992 |
| FR | 2794236 | 12/2000 |

OTHER PUBLICATIONS

Taku Murakami et al.:"Precision Angle Sensor Unit For Construction Machinery" Sep. 8–10, 1997.

* cited by examiner

*Primary Examiner*—F. Daniel Lopez
(74) *Attorney, Agent, or Firm*—Gibbons, Del Deo, Dolan, Griffinger & Vecchione

(57) ABSTRACT

A sensor mountable within a hydraulic cylinder provides a precision signal indicative of the position of the piston. The sensor includes a flexible connector attached between the cylinder piston and a converting element for sensing the piston displacement. The converting element comprises a pick-up spool, under tension, coupled to the other end of the connector and rotatable about an axis. A lead screw engages threads on the spool, and translates linearly when the spool rotates. A non-contacting electromechanical transducer senses the position of the lead screw, and provides an output signal proportional to the motion or position of the movable element. The transducer may be an LVDT or other transducer. A high-pressure seal assembly provides an electrical path between the sensor and an external connector. A piston stop prevents the piston from damaging the sensor. The sensor is held within the cylinder by port inserts threaded into standard cylinder hydraulic fluid ports and advanced inwardly to grip the sensor.

11 Claims, 17 Drawing Sheets

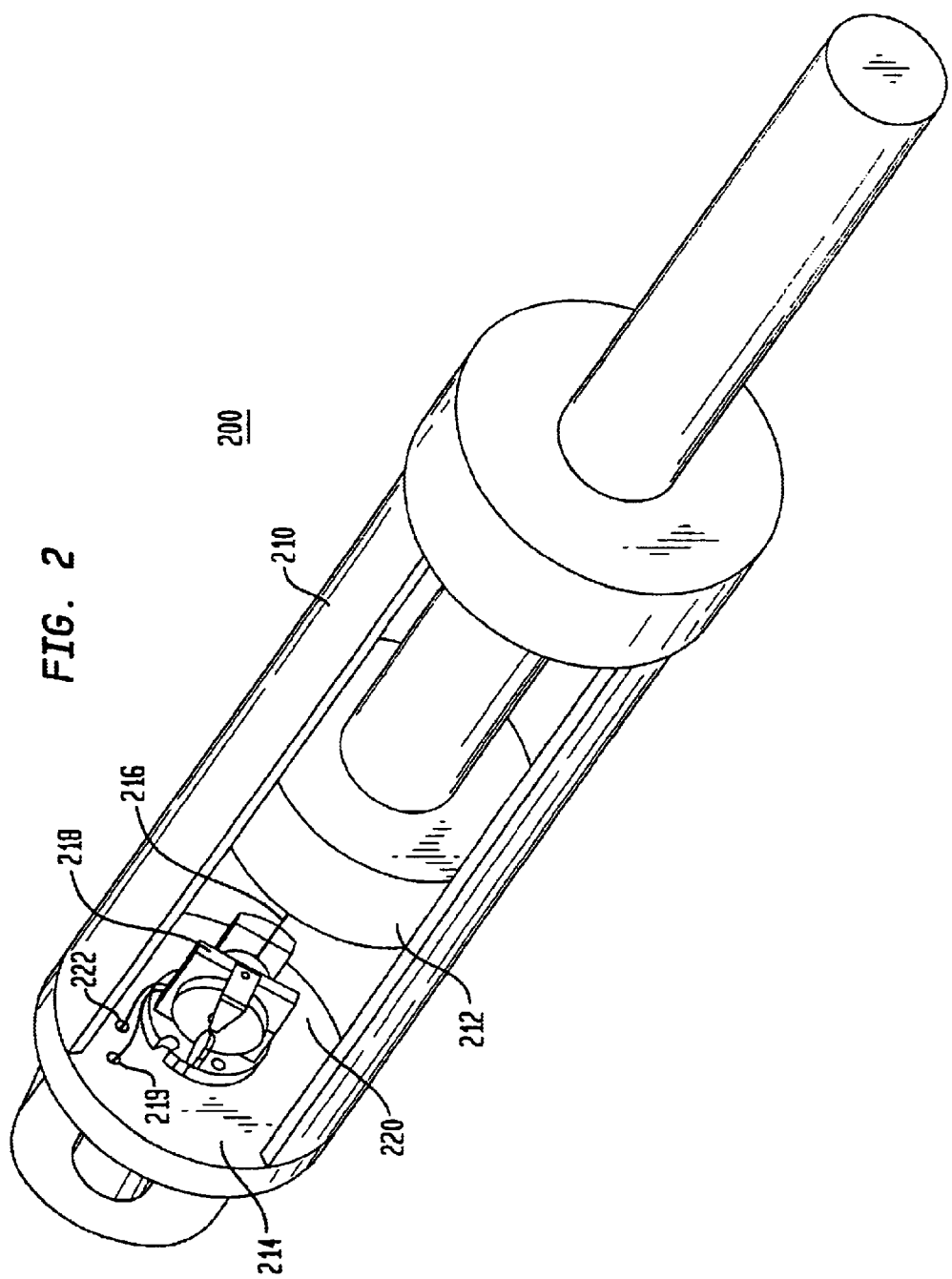

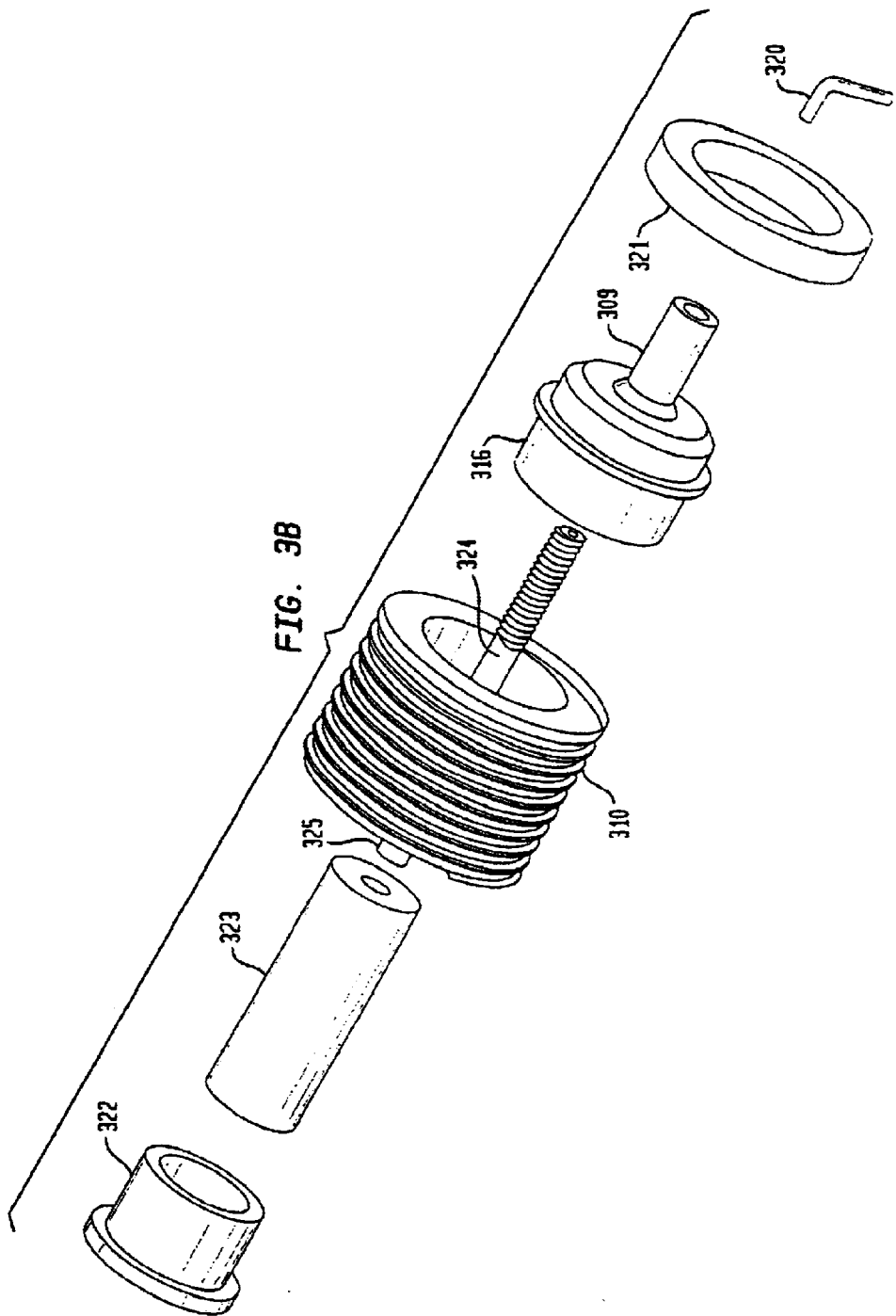

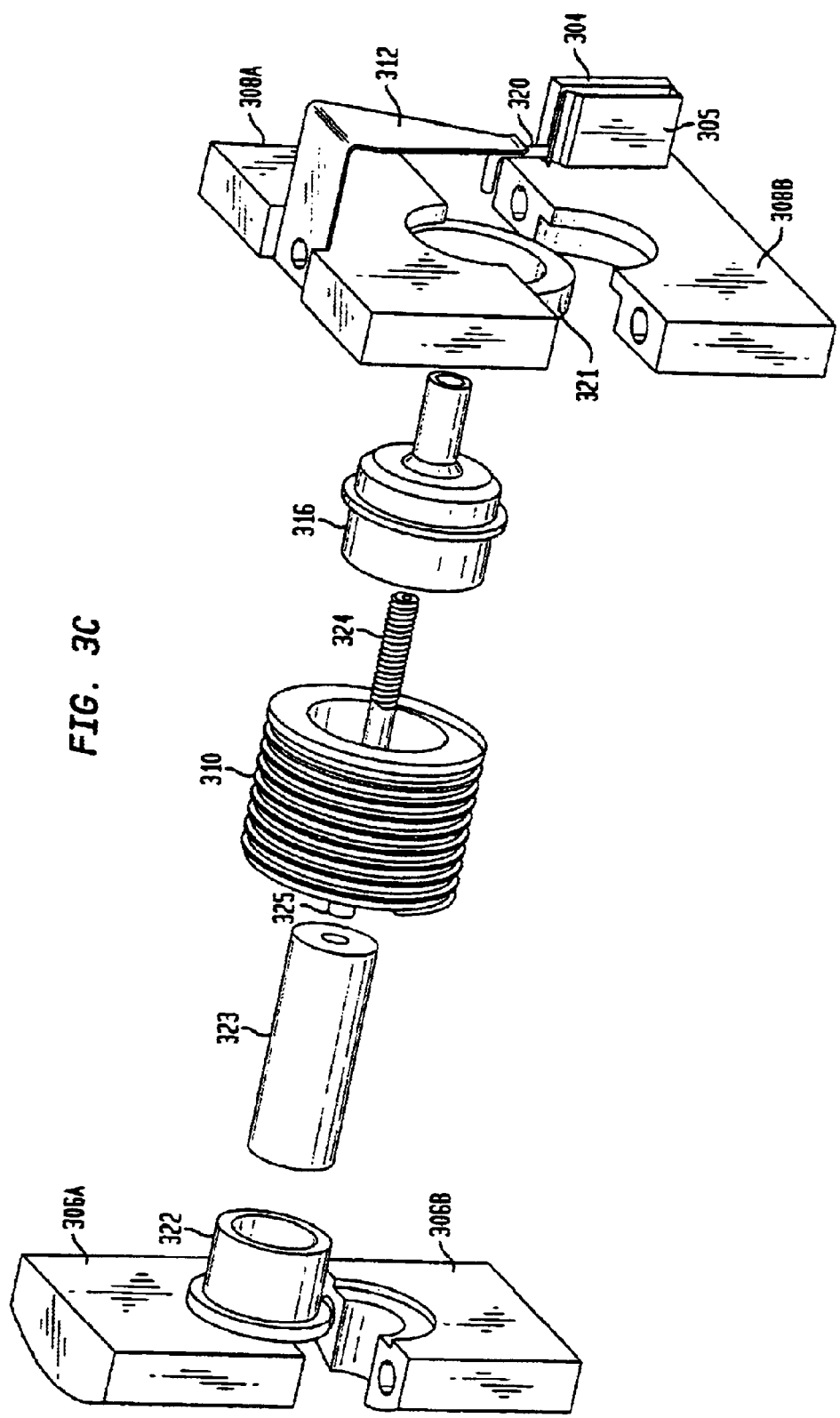

PRECISION SENSOR FOR A HYDRAULIC CYLINDER

RELATED APPLICATIONS

This application is a continuation-in-part of and claims the benefit of U.S. application Ser. No. 09/302,701, filed on Apr. 30, 1999, now U.S. Pat. No. 6,234,061 entitled "PRECISION SENSOR FOR A HYDRAULIC CYLINDER" which, in turn, claims the benefit of U.S. Provisional Application No. 60/104,886 filed on Oct. 20, 1998.

FIELD OF THE INVENTION

The invention generally relates to position sensors, and more particularly, to linear position sensors for use on power cylinders.

BACKGROUND

Equipment implementing hydraulic cylinders for mechanical movement, such as excavators and other heavy construction equipment, depend upon operators to manually control the moveable elements of the equipment. The operator must manually move control levers to open and close hydraulic valves that direct pressurized fluid to hydraulic cylinders. For example, when the operator lifts a lift arm, the operator actually moves a lever associated with the lift arm causing a valve to release pressurized fluid to the lift arm cylinder. The use of levers to control hydraulic equipment depends upon manual dexterity and requires great skill. Improperly operated equipment poses a safety hazard, and operators have been known to damage overhead utility wires, underground wiring, water mains, and underground gas lines through faulty operation of excavators, bucket loaders or like equipment.

In addition to the safety hazards caused by improperly operated equipment, the machine's operating efficiency is also a function of the operator's skill. An inexperienced or unskilled operator typically fails to achieve the optimum performance levels of the equipment. For instance, the operator may not consistently apply the force necessary for peak performance due to a concern over striking a hazard. Efficiency is also compromised when the operator fails to drive a cylinder smoothly. The operator alternately overdrives or underdrives the cylinder, resulting in abrupt starts and stops of the moveable element and thereby derating system performance. As a result, the skill level necessary to properly and safely operate heavy equipment is typically imparted through long and costly training courses and apprenticeships.

There have been various attempts at implementing an automated control system for use on heavy equipment. One such system is disclosed in U.S. Pat. No. 4,288,196. The system described therein provides for a computer programmable system for setting the lowermost point of a backhoe bucket. In U.S. Pat. No. 4,945,221, a control system for an excavator is disclosed. The system attempts to control the position of the bucket cutting edge to a desired depth. Another position locating system for heavy equipment is disclosed in U.S. Pat. No. 5,404,661.

These systems and others like them share a common feature in that they implement a position sensor. Typically, these sensors are rotary potentiometers as, for instance, suggested in Murakmi, Kato and Ots, *Precision Angle Sensor Unit for Construction Machinery*, SAE Technical Paper Series 972782, 1997. This sensor relies upon a potentiometer which changes a voltage or current in relation to the position of a bucket or boom. Other types of sensors rely upon optical, conductive plastic, or metal-in-glass technologies.

It is a disadvantage of these sensors that they mount to the outside of the machinery, thereby exposing them to the environment. In the case of heavy equipment, this environment includes severe temperatures, excessive moisture, and air-borne particulate matter which may infect the sensor. In the case of optical, conductive plastic and metal-in-glass technologies, the sensors would rapidly degrade if used on construction equipment. Furthermore, some of these sensors use contacting components that are susceptible to wear, vibration and temperature. As a result, no sensor mountable to the outside of heavy equipment or relying upon contacting elements has gained widespread use in the industry.

There have been attempts to overcome the limitations of noncontacting sensors by using electromagnetic energy. For example, the system disclosed in U.S. Pat. No. 4,945,221 discloses using lasers for sensing problems. Others suggest using RF energy or the like to provide a feedback signal. These systems, however, have not replaced the less expensive potentiometers due to their complexity of use and their expense.

As the demands placed upon actuated machinery increases, so does the demand for a low cost, long-life sensor operable in a harsh environment. Despite the development of highly sophisticated control systems, computer processors and application specific software, the implementation of this technology in electrohydraulic equipment has been curtailed by the failure to provide a long-life, cost-effective precision sensor operable in harsh environments.

SUMMARY OF THE INVENTION

A sensor according to the principles of the invention provides a precision signal utilizing a non-contacting transducer. In an exemplary embodiment, the sensor mounts inside a hydraulic cylinder, away from the harsh environment, and provides a signal indicative of the position of the piston. The sensor provides a connector, attached between a cylinder piston and a converting element, for sensing the displacement of the piston. The converting element converts the cylinder displacement to a proportional displacement of a translating member. A precision transducer senses the displacement of the translating member and provides an electrical output signal proportional to the piston movement or to the piston's position.

In one exemplary sensor according of the principles of the invention, a flexible connector such as a cable is attached to the movable element (a piston). The converting element comprises a pick-up spool coupled to the other end of the connector and rotatable about an axis. The spool is under tension from a recoil mechanism, such as a spring, coupled to the spool. A translating member, which can be a lead screw, engages threads on the interior of the spool, and translates along an axis when the spool rotates. A transducer is disposed to sense a position or motion of the translating member, and provides an output signal proportional to, and therefore indicative of, the position (or motion) of the translating member. The transducer can be a linear variable differential transformer (LVDT), which is a non-contacting transducer. Of course, other transducers, including those using contacting components can be used.

As a further feature of a sensor according to the principles of the invention, and as a still further exemplary embodiment thereof, there is provided a construction of the sensor frame by the use of a plurality of stamped plates that are contained within the hydraulic cylinder, preferably about five of such stamped plates and which stamped plates facilitate the ease and therefore reduce the cost of the constructing of an exemplary sensor, that is, with the use of a plurality of stamped plates, a frame for the sensor can be readily formed by the stamping process and which eliminates the need for specially complex machined blocks to thus reduce the cost of such construction. Also, with such embodiment, in addition to the considerable cost savings, there is a greater flexibility in the production of sensor frames of differing sizes by merely adapting the stamping techniques to produce the stamped plates of the appropriate dimensions for the particular desired size of sensor. As such, with relatively minimal tooling changes, the size of the various sensor frames can be changed, modified and adapted to accommodate a wide variety of dimensioned sensors to be located within the hydraulic cylinder.

As a still further exemplary embodiment, there is provided an improved mounting means whereby the sensor can be physically mounted within the hydraulic cylinder by utilizing the standard hydraulic threaded fluid ports that are normally found on such hydraulic cylinders. In this improved mounting means, use is made of the pair of standard hydraulic fluid ports that are located about 180 degrees apart on the periphery of the hydraulic cylinders. Flexible end caps comprised of a flexible material such as urethane, are positioned about the sensor and juxtaposed and in alignment with each of the fluid ports of the hydraulic cylinder. Two port inserts are then threaded, respectively into each of the standard fluid ports and those inserts are advanced by the user until they capture the sensor therebetween and thus sandwich the sensor comfortably but firmly between the port inserts to hold the sensor in a fixed position in place within the hydraulic cylinder. With the use of the flexible end caps, there is some inherent flexibility in the mounting means in order to isolate the sensor from shock and vibration that otherwise could affect the performance and long term durability of the sensor. There may also be some form of ribs, protrusions, button or any other molded feature that can enhance or add to the cushioning effect to provide the isolation of the sensor from the walls of the hydraulic cylinder. The port inserts are hollow such that the normal passage of the flow of hydraulic fluid is not impeded or occluded into and out from the hydraulic cylinder. In order to pass the electrical wires that are necessarily connected to the sensor located within the hydraulic cylinder to provide an outside connector to that sensor, i.e. for connection to external electrical equipment, such wiring is conveniently passed through one or both of the port inserts by a specially constructed high pressure seal assembly that maintains a sealed environment within the hydraulic cylinder and yet allows the wires to be connected to the equipment external of the cylinder.

In order to pass the electrical conductors through the wall of the hydraulic cylinder, there is a high pressure seal assembly that provides an electrical path for the sensor that is located within the high pressure environment of the cylinder to an external connector that is in the ambient environment so that some external electronic equipment can recognize the various signals from the sensor and interpret those signals to determine the position of the piston. The high pressure seal assembly therefore comprises a thermoplastic connector that cooperates with one of the aforedescribed hollow port inserts and which has a plurality of solid conductive pins that extend from a connector within the cylinder to an external connection in the outer environment. The pins are sealed within the plastic material of the connector and may be affixed therein by ultrasonic swaging or insert molding to insure a good seal along the solid conductive pins to prevent leakage from the high-pressure environment. The external peripheral surface of the connector can be sealed within the opening in the wall of the cylinder by means such as an O-ring. The eventual seal is relatively low cost and yet has the pressure resistance necessary for the application. As an advantage, the high pressure seal assembly according to the principles of the invention allows the use of the standard hydraulic fluid port already present in commercial hydraulic cylinders, and provides an inexpensive easily facilitated means of forming an electrical path from a high pressure environment to a environment normally at ambient atmospheric pressure.

As a still further feature, and which may be optional, there are provided piston stops within the hydraulic cylinder in order to protect the sensor. Since the sensor of this invention is preferably located within the hydraulic cylinder, it is possible during the normal operation of the hydraulic cylinder for the piston to be fully retracted and, in such case, the piston could encounter the sensor and crush that sensor. The piston stops are therefore incorporated as components of the construction of the sensor and its mounting means, such that the sensor can be safely located within the hydraulic cylinder at the back end thereof and which prevents the piston from contacting and potentially damaging the sensor. The piston stops can be constructed of a metal stamping and are formed to have an arcuate configuration to fit in a complementary relationship with the interior of the hydraulic cylinder. By the use of the piston stops, standard hydraulic cylinders can be used and the sensor is protected and wherein there is no need for the manufacturer of the hydraulic cylinders to build in costly stops or bumpers in the manufacturing of the cylinders themselves.

For use in a hydraulic cylinder, the sensor's operation is like this. As the cylinder piston moves within the cylinder, the spool feeds out or draws in cable, thereby tracking the piston's linear displacement. As the cylinder moves toward the spool, the spring causes the spool to wind the cable. When the cylinder moves away from the spool, the cylinder force overcomes the spring tension and pulls cable off the spool. The spool is in threaded engagement with a lead screw. As the spool rotates, the spool and lead screw converts the rotary motion of the spool to a linear displacement of the lead screw. The displacement is proportional to the piston displacement. The lead screw is attached to an LVDT core that moves within a LVDT body when the cylinder moves. The LVDT delivers an electrical signal at its output, which can be configured as a position signal, rate signal or the like.

BRIEF DESCRIPTION OF THE DRAWINGS

A more complete understanding of the invention may be obtained from consideration of the following description in conjunction with the drawings in which:

FIG. 2 shows a perspective of an exemplary cylinder according to the principles of the invention;

DETAILED DESCRIPTION

Figure 1:
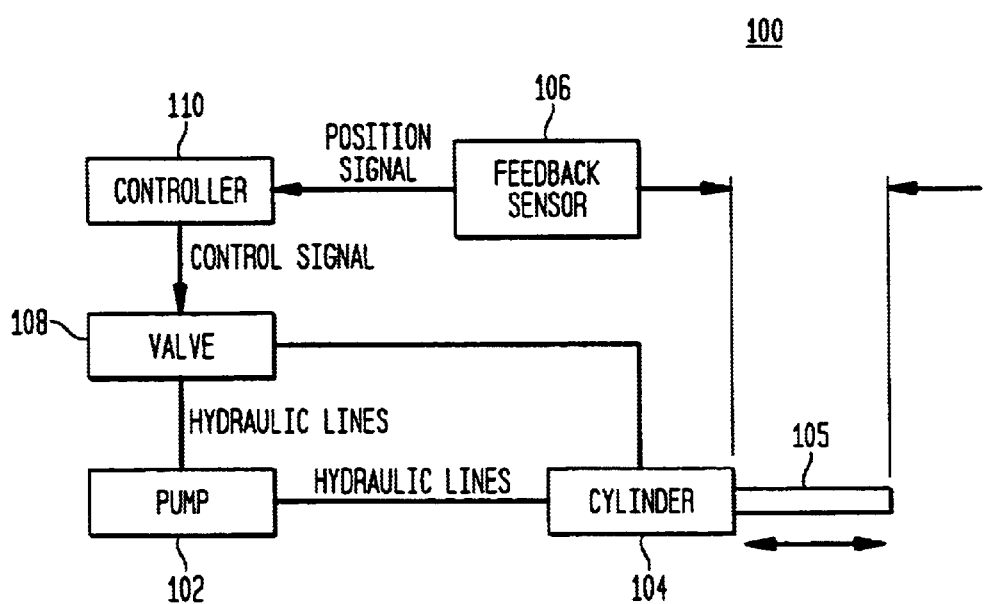
FIG. 1 is a block diagram of an exemplary feedback control system for a hydraulic cylinder.

A feedback sensor for a cylinder according to the principles of the invention provides a precision signal indicative of a piston position with relation to a cylinder. The sensor is durable, maintains a long life and is configured for use in harsh environments. An exemplary sensor mounts inside a hydraulic cylinder, thereby protecting the sensor, and uses a non-contacting transducer to provide the precision signal. A converting element converts the motion of the piston to a proportional motion of a translating member. The transducer, which can be located remotely from the piston, senses the position of the translating member, and provides an electrical output signal indicating the piston's position. This signal can be conditioned and used in a feedback control system, a user interface or any system where such a signal is desirable. In FIG. 1, a block diagram of an exemplary feedback control system 100 is shown. The control system 100 comprises a hydraulic cylinder 104 actuated by a pump 102 and a valve 108. As is known in the art, the pump 102 delivers hydraulic fluid under pressure to the cylinder 104 which forces the piston 105 to move with respect to the cylinder. The valve 108 controls the flow of hydraulic fluid to the cylinder 104. To implement feedback control, a feedback sensor 106 senses the position of the piston 105 and delivers a position signal to a controller 110. The controller 110 actuates the valve 108 according to certain instructions. The piston 105 may be attached to some other apparatus (not shown) whereby a displacement of the piston causes a displacement of the apparatus. Although a hydraulic cylinder is shown, it should be apparent that other types of cylinders, such as pneumatic cylinders, can be used.

Referring to FIG. 2, a hydraulic cylinder 200 that can be used in the feedback control system of 100 of FIG. 1 is shown. The hydraulic cylinder 200 comprise a cylinder enclosure 210 and a piston 212. The piston 212 is operable to translate in dependence upon hydraulic fluid pumped into the cylinder. The cylinder enclosure 210 further includes a base 214, and the piston 212 is a moveable element with respect to the base. A precision sensor 218 provides a position-related signal across the terminals 219 and 222. For instance, the sensor delivers a signal across the sensor's terminals indicative of the position "d" in FIG. 2. A high-pressure bulkhead connector (not shown) provides a mechanism for routing the terminals 219 and 222 to the outside of the cylinder enclosure 210. The sensor 218 further comprises a flexible connector 216 attached to the piston 212, a converting element 220 attached to the base 214 and a transducer (not shown). The connector 216 also attaches to the converting element 220 and directly imparts the displacement of the piston 220 with respect to the base 214 to the converting element 220. The converting element 220 converts this displacement to a proportional displacement of a translating member (not shown). The transducer, located remote from the piston, senses the position or motion of the translating member.

Figure 3A:
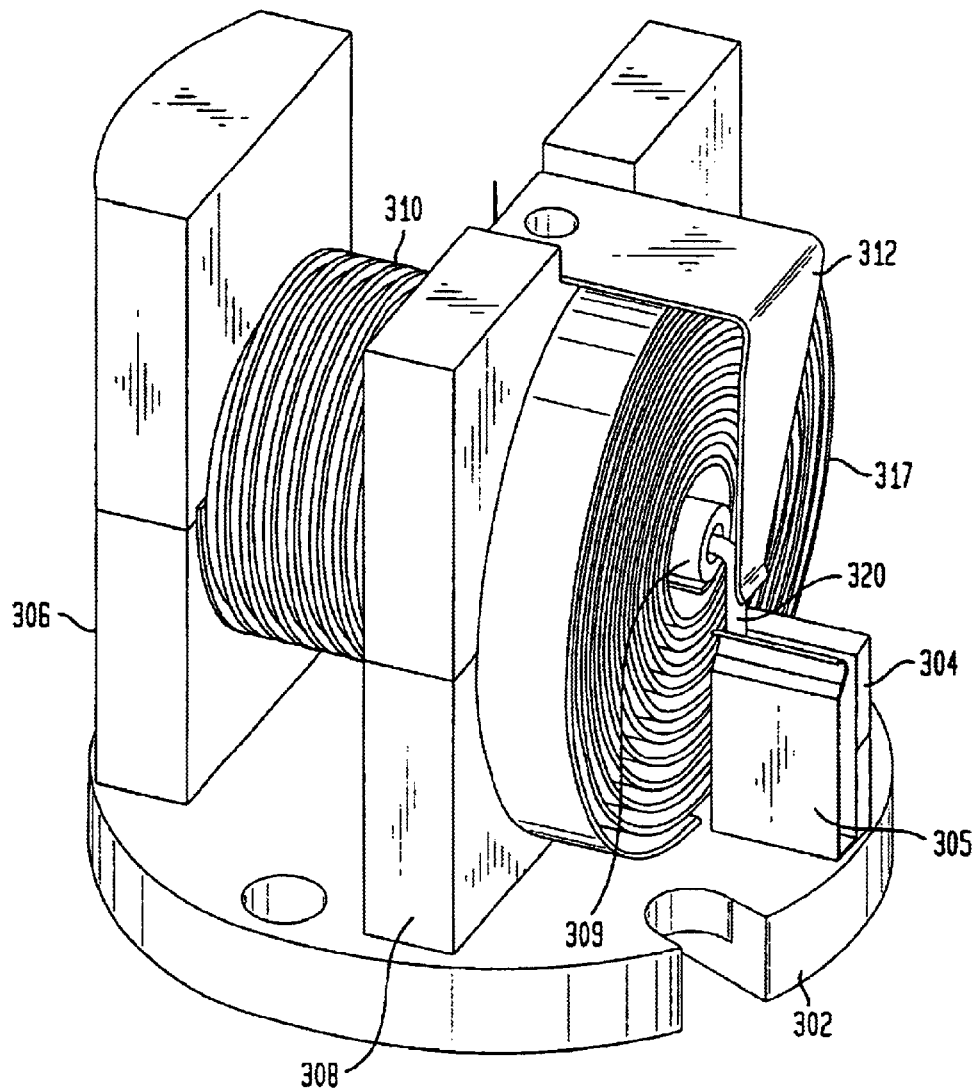
FIGS. 3A, B and C show an exemplary sensor according to the principles of the invention.

An exemplary embodiment of the converting element 220 is described with reference to FIGS. 3A, 3B and 3C. A first mounting element 302 is provided for attaching the converting element 220 to, for instance, the base of the hydraulic cylinder. A second mounting element 306 and a third mounting element 308 are fixedly attached to the first mounting element 302. The converting element 220 includes a rotating element 310 rotatably attached between the second mounting element 306 and the third mounting element 308. An anti-backlash spring 312 is mounted to the third mounting element 308. A block 304 and an anti-rotation spring 305 are attached to the first mounting element 302. An arm 320 attaches to a translating member 324 at one end and engages the block 304 at the other. A spring 317 for providing a rotary mechanism for the rotating element 310 is housed in a spring housing or spring mounting (not shown). The housing is attached to the first mounting element 302.

In FIGS. 3B and 3C, an exploded view of the converting element 218 is shown. A press-in hub 316 having a shaft 309 with internal threads is rotatably attached to a bushing 321. The bushing is fixedly attached to the third mounting element 308. For ease of installation, the third mounting element can comprise an upper half 308A and a lower half 308B. The translating member 324, having threads formed thereon, engages the internal threads of the hub 316. The rotating element 310 defines an internal opening into which the hub is pressed so that it rotates as the rotating element 310 rotates. On a side opposite the hub 316, a bushing 322 fixedly mounts in the second mounting element 306 which can also comprise an upper half 306A and a lower half 306B. As shown in FIG. 3C, the brackets 306 and 308 define a circular opening for attaching the bushings 322 and 321, respectively. An axle 323 attaches to the bushing 322, and the rotating element 310 rotatably engages the bushing 322. In this exemplary embodiment, the transducer is a linear variable differential transformer (LVDT) which has a core and a body. The LVDT body acts as the axle 323. Alternatively, the LVDT body can be internal to a separate axle. The LVDT core 325 is attached to the translating member 324 and disposed to translate within the LVDT body.

Operation of this exemplary sensor is explained with reference to FIGS. 2, 3A, 3B and 3C. The flexible connector 216 attaches to the piston 212 which causes the rotating element 310 to rotate in a first direction when the piston 212 moves away from the cylinder base 214. When the piston travels toward the cylinder base 214, the spring 317 causes the rotating element 310 to rotate in a direction opposite to the rotation caused by the piston moving away from the base 214. In other words, the flexible connector winds around the rotating element 310 when the piston 212 moves toward the base 214, and unwinds from the rotating element 310 when the piston moves away from the base. The linear motion of the piston 212 converts the angular motion of the rotating element 310 via the pulling action of the piston on the flexible connector and due to the rotational action of the spring 317.

As the rotating element 310 rotates, the hub 316 rotates with it. The hub's internal threads engage threads on the translating member 324. As the rotating element and the hub rotate, the threaded engagement causes the translating member 324 to move linearly along the rotational axis of the rotating element 310. The thread arrangement is chosen such that the movement of the translating member is proportional to the movement of the piston. The threads can be acme, square, modified square, buttress, unified, ISO, ball bearing, extra-fine pitch or any other of various known threads. Likewise, the position of the translating member 324 with respect to the transducer is in a one-to-one correspondence with the position of the piston 212. The LVDT 323, 325 senses a position (or a movement) of the translating member and provides a position related signal.

The precision and performance of the sensor is enhanced by providing the previously set forth anti-rotation elements 320, 304 and 305 and anti-backlash elements 309 and 312. When the rotating element 310 rotates, causing the translating member 324 to translate along an axis, there is a small frictional force between the inner threads of the hub and the external threads formed on the translating member. This small frictional force is overcome before the translating member moves. To overcome this force, the arm 300 is provided at an end of the translating member 324. The arm 320 bends substantially perpendicular to a longitudinal axis of the translating member and engages the block 304. For purposed of illustration, the arm 320 is shown engaging the block in FIG. 3A such that, when the rotating element 310 rotates in a counterclockwise direction, the block inhibits the arm 320 from turning, thereby overcoming any frictional force arising from the threaded engagement.

The anti-rotational spring 305 applies a force to the arm such that it engages the block 304 at substantially all times. The force exerted by this spring is perpendicular to the longitudinal axis of the translating member 324 and is chose such that it overcomes the frictional force caused by the threaded engagement when, with reference to FIG. 3A, the rotating element 310 rotates in a clockwise direction. It should be apparent that various other equivalent structures can be used to inhibit the motion of the arm 320 when the rotating element 310 rotates. For instance, instead of the spring 305, another block can be used. Thus, the arm 320 can be held between the two blocks or a slot formed in one block. In any configuration, the anti-rotational forces upon the arm 320 are such that the arm translates when the rotating element 310 rotates.

In addition to the frictional force inherent in the threaded engagement, the tolerances of the threads can introduce a dead space between the threads, For example, when the translating member 324 changes direction, due to a change in the direction of the motion of the piston 212, the piston can move some small distance before the threads engage. In other words, depending upon the thread tolerance, there may be play between the threads. This is overcome by the anti-backlash spring 312 attached to the bracket 308. The spring applies a force to the arm 320 directed along the translating member's longitudinal axis. This force holds the translating member in substantially constant thread engagement with the internal threads of the hub 316. The force exerted by this spring is chosen such that the translating member may move against the spring when the piston displaces to cause such movement.

It should be apparent that various materials and configurations can be used to implement a sensor according to the principles of the invention. For instance, the rotating element 310 can be configured to enhance the performance or the sensor by forming grooves thereon so that the flexible connector 216 winds up along successive grooves of the rotating element 310. In this way, no portion of the flexible connector 216 lies over another portion. Alternatively, wind guides can be used, or for displacements of large magnitude relative to the storage capacity of the rotating element, the rotating element can be configured such that some portions of the flexible connector overlay other portions of the flexible connector.

Likewise, various materials can be used for the flexible connector. A connector made of Kevlar, and materials like it, provide desirable attributes, including low stretch, tolerance to hydraulic fluid environment, and stability over a wide range of temperature (low coefficient of thermal expansion). For example, Kevlar, is known to have a coefficient of thermal expansion on the order of −0.000002/degree Fahrenheit (−2 parts per million per degree Fahrenheit). The connector can also comprise other types of cable, such as metallic cable, Nylon, or stranded cable and can be coated to provide longer life or to adjust the coefficient of friction. Its diameter can also be adjusted to meet storage needs on the rotating element or to decrease windage. Similarly, the connector can be affixed to the rotating element or moveable element by well known methods, such as a clevis pin, weld, bolt or screw, splice, adhesive, threaded terminal, swayed oval, eye, ball and socket, thimble, or a strap fork.

In the embodiment shown in FIGS. 2, 3A, 3B and 3C, the transducer is a linear variable differential transformer (LVDT). It should be apparent to those skilled in the art that other types of transducers can be implemented without departing from the principles of the invention, including differential variable reluctance transducers (DVRTs), wire wound potentiometers, conductive plastic potentiometers, inductive or capacitive sensors, Hall-effect transducers, or sensors based upon light emitting diodes or laser light. In each case the target element for the transducer affixes to the translating member. The sensing element is disposed to sense the motion or position of the target element. Similarly, the rotational spring can be a spiral torsion spring, a twisted elastic element, a round tension or compression spring, a cantilever tension or compression spring or any other type of spring which may be usable to impart a rotational action on the rotating element. Likewise, the arm 320 can also be a pin or other similar structure for engaging the block 304 and the anti-backlash spring 312.

Figure 4:
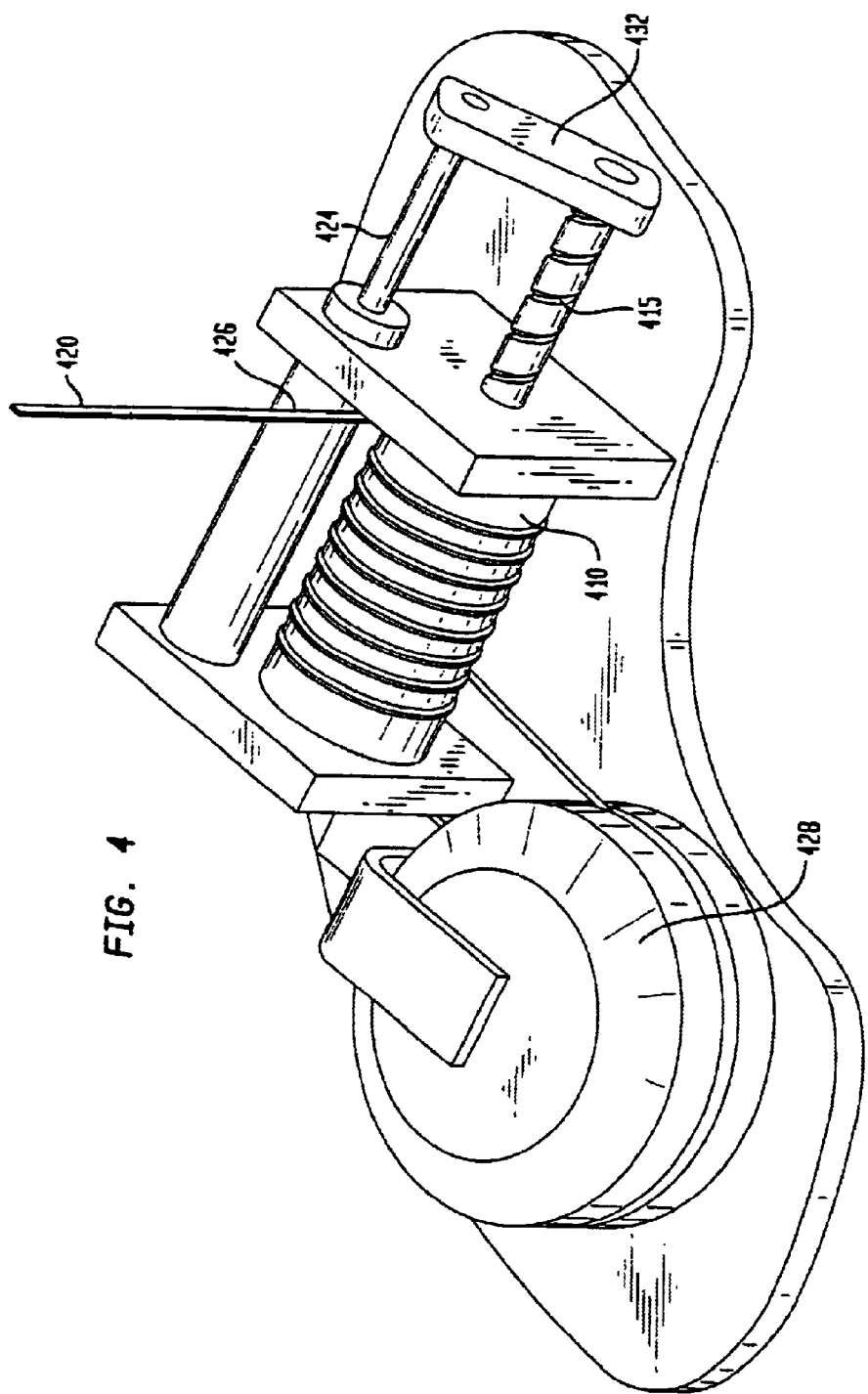
FIG. 4 shows another exemplary sensor according to the principles of the invention.

Another exemplary embodiment of a sensor according to the principles of the invention is shown in FIG. 4. In this embodiment, an LVDT core 424 is caused to translate along an axis substantially parallel to an axis of rotation for a rotating element 410. The flexible connector 420 affixes to the rotating element 410 and to a movable element (not shown). A lead screw 415 threadedly engages the rotating element 410 at one end. At another end, the lead screw is affixed to an arm 422. Th LVDT core 424 affixes to the other end of the arm 422 and is disposed to translate in an LVDT body 426. When the flexible connector is pulled such that it unwinds from the rotating element 410, the threaded engagement causes the lead screw 415 to translate. This, in turn causes the LVDT core 424 to translate within the LVDT body 426. A recoil mechanism 428 causes the rotating element 410 to wind the connector 420 when the moveable element (not shown) moves such that there is no tension on the connector 420. This also causes the LVDT core 424 to translate within the LVDT body 426. The LVDT thereby provides a position-related signal for the movable element (not shown).

Figure 5:
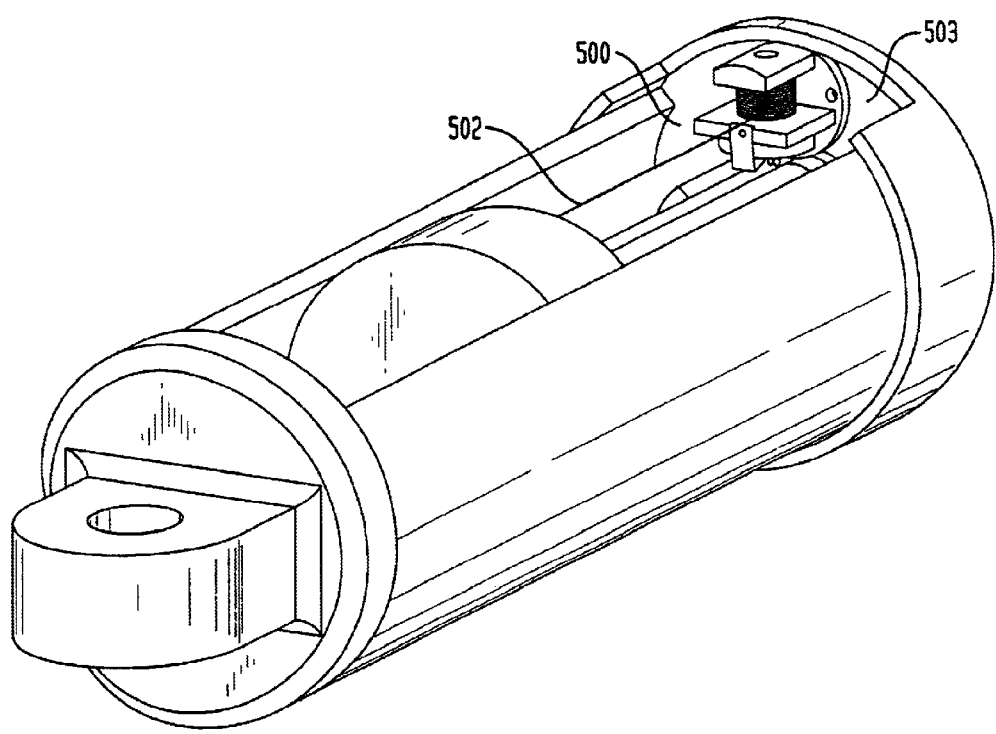
FIG. 5 shows another exemplary sensor according to the principles of the invention.

Of course, the sensor can also be affixed in various locations within a cylinder. For instance, in FIG. 5, a sensor 500 is shown attached to the cylinder end cap 503 defining the piston shaft aperture. The flexible connector 502 is affixed to the same side of the piston as the shaft. Operation of this configuration is the same with respect to FIGS. 2, 3A, B and C.

Figure 6:
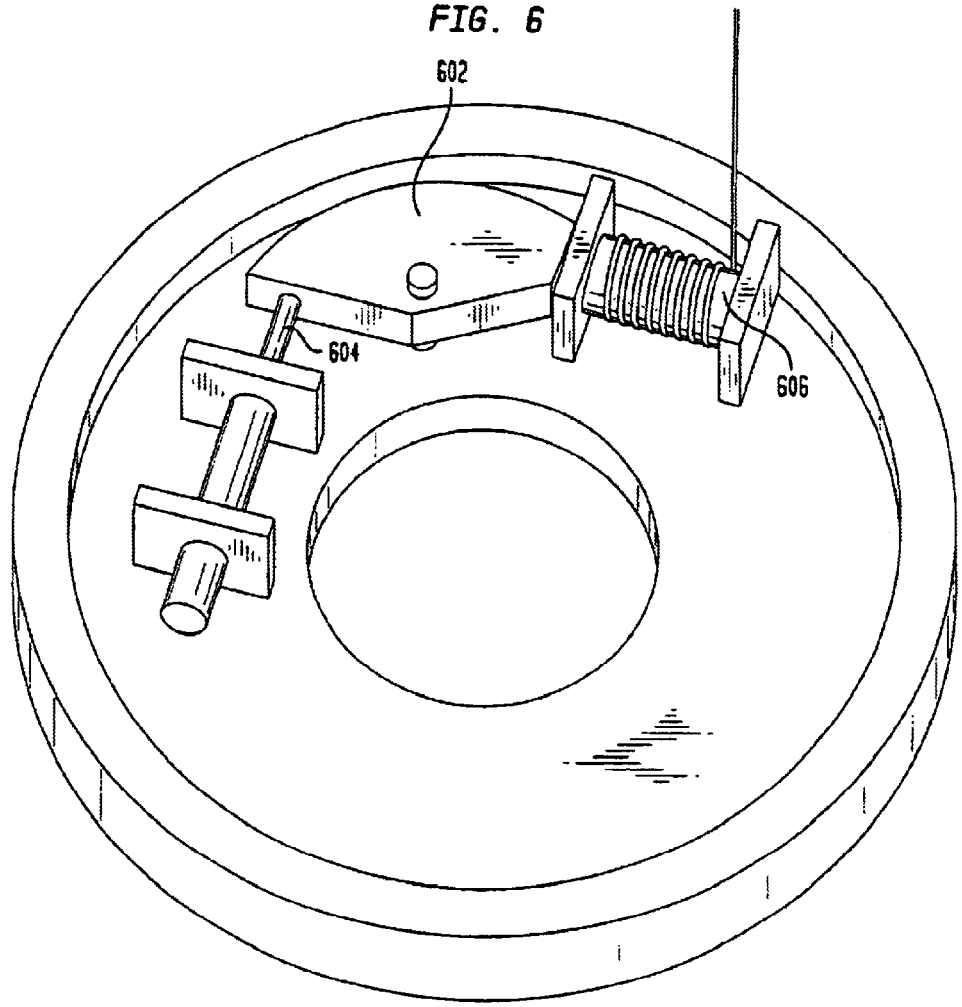
FIG. 6 shows another exemplary sensor according to the principles of the invention.
Figure 7:
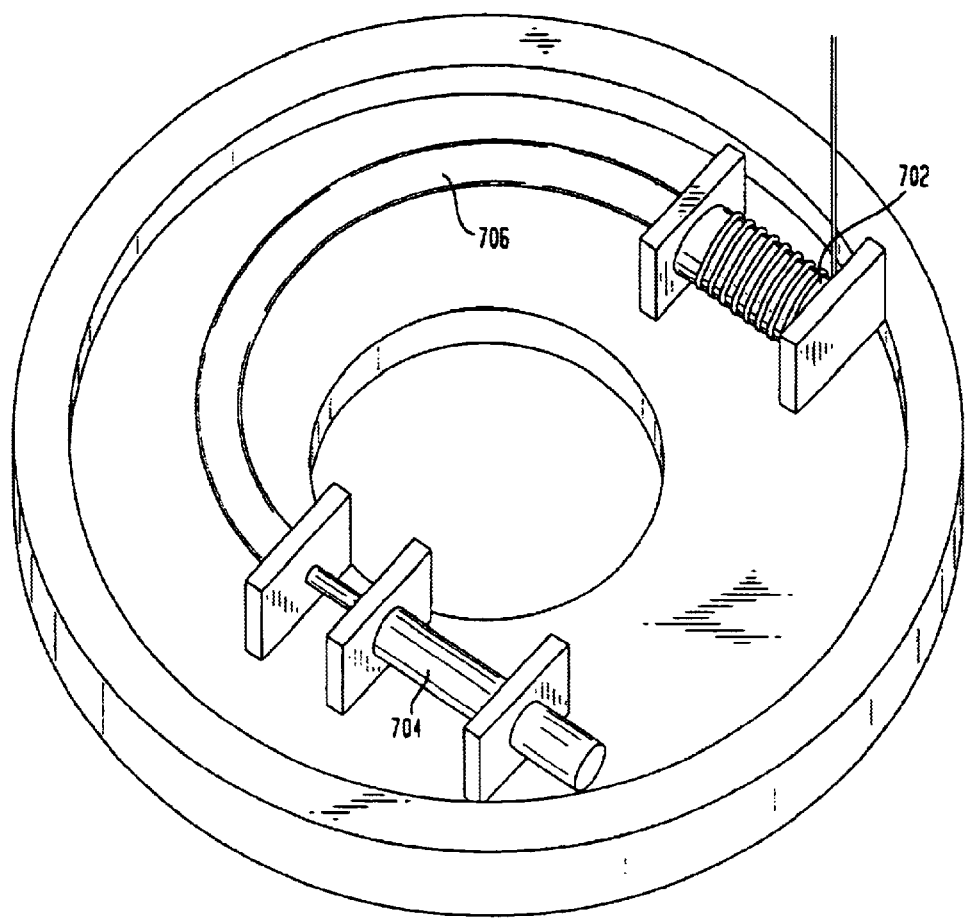
FIG. 7 shows another exemplary sensor according to the principles of the invention.

It should also be apparent that various mechanical connections can be made between the transducer and the converting element of the sensor. In FIG. 6, an actuated cam 602 is shown engaged with an LVDT core 604 and with the sensor's converting element 606. In FIG. 7, a mechanical connection between the converting element 702 and the transducer 704 is made via an extension cable 706. Likewise, the converting element can be configured in various ways without departing from the principles of the invention. For instance, gears instead of threads can convert the linear displacement of the movable element to the linear displacement of the translating member. It should also be apparent that for applications with relatively large displacements of the movable member or where an obstruction is located between the converting element and the movable element, various pulleys, guides or blocks and tackle can be provided to route the connector from the movable element to the sensor's converting element.

Figure 8:
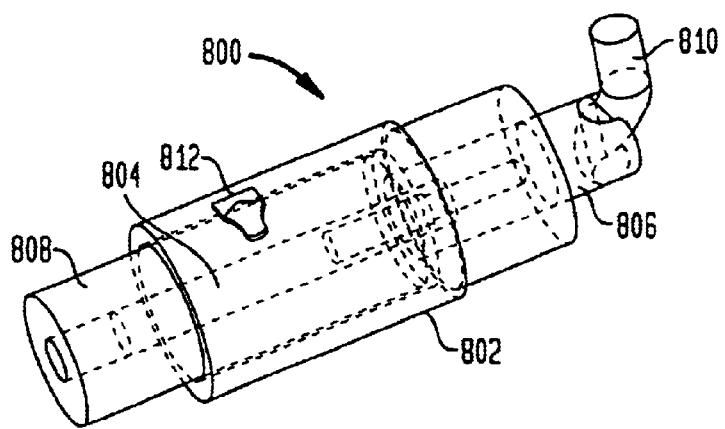
FIG. 8 shows an exemplary component according to the principles of the invention.

Turning now to FIG. 8, there is shown a perspective view, partly in section, and showing an exemplary embodiment of some of the components that are used in constructing the converting element 800. In FIG. 8, thereof there is a rotating hub 802 that basically, as explained with respect to FIGS. 3A, 3B and 3C, rotates as the connector (not shown) is unwound and wound as determined by the position and movement of the piston (not shown). As the connector is extended and retracted proportionally with the piston movement, the rotating hub 802 thus rotates and is threadedly engaged to the LVDT core 804 affixed to a translating lead 806. By means of that threaded engagement, therefore, as the rotating hub 802 rotates, the LVDT core 804 moves along a linear path within the fixed LVDT body 808 to carry out the sensing of the rotation of the rotating hub 802 and, correspondingly, as explained, determines the position and movement of the piston. An anti-rotation tab 810 is provided to prevent the rotation of the LVDT core 804 so that the translation of the LVDT core 804 is solely along a linear path and not a rotational path. As may also be seen in FIG. 8, there is a notch 812 provided in order to attach the recoil spring, again, not shown in FIG. 8.

Figure 9A:
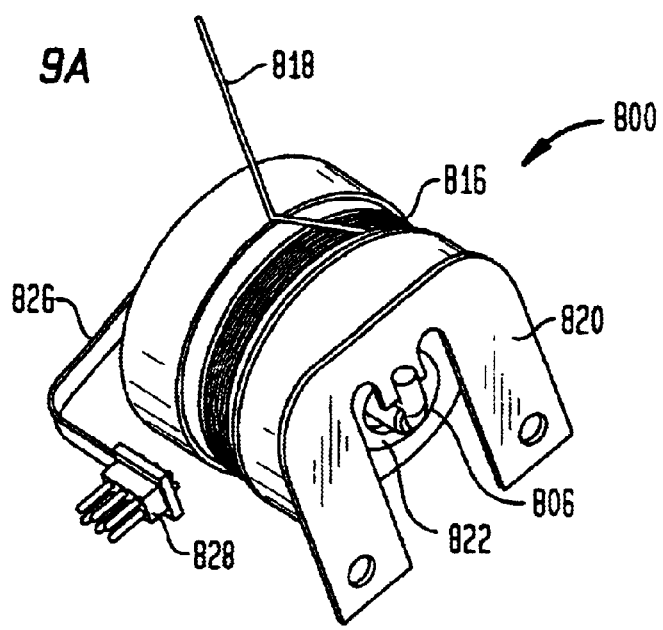
FIGS. 9A and 9B show an exemplary embodiment of certain components according to the principles of the invention.
Figure 9B:
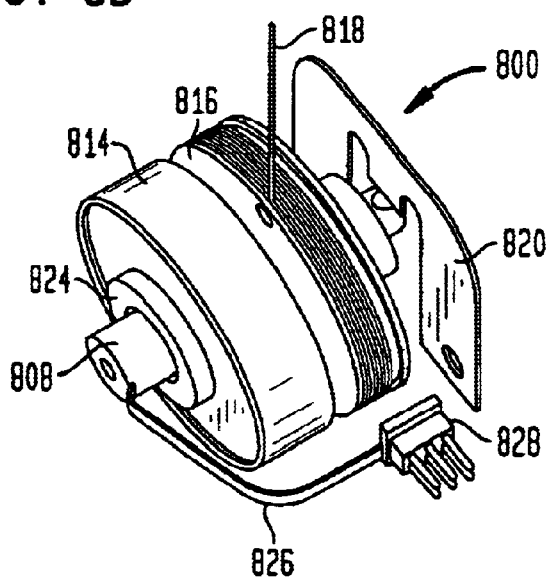

Turning now to FIGS. 9A and 9B, taken along with FIG. 8, there are shown perspective views, taken at different angles, showing the basic components of the translating element 800 of the present invention and used to make up the overall sensor used with that invention. Thus, there is a recoil spring casing 814 the surrounds the coil spring and the spool 816 on which is coiled the connector 818 as was previously explained. Again, however, as a summary, the spool 816 is rotated as the connector 818 winds and unwinds in accordance with the movement of the piston (not shown) and that rotational movement of the spool 816 is converted to a translational linear movement of the LVDT core 804, which linear movement is thus sensed with respect to the fixed position of the LVDT body 808 to provide a recognizable signal that can be interpreted to indicate a positional parameter of the piston. The rotational movement is therefore converted to the linear translational movement of the LVDT core 804 by means of the threaded engagement described with respect to FIG. 8.

The potential backlash between the respective threads of the threaded engagement is curtailed or prevented by means of backlash spring 820. As also can be seen, there is a first hub bushing 822 and a second hub bushing 824, again previously described, and the LVDT body 808 extends through that second hub bushing 824 and a set of electrical wires 826 extend from the LVDT body 808 and terminate in a LVDT male connector plug 828. Obviously, as will become clear, the electrical wires 826 transmit the signals indicative of a particular positional parameter of the piston to external electronic equipment that can interpret and use those signals. It should also be noted, at this point, that the components described with respect to FIGS. 8, 9A and 9B are all located within the hydraulic cylinder and thus are submersed in the hydraulic fluid, including the electrical wires 826 and the LVDT male connector plug 828 and it is therefore desirable to transmit the signals from the LVDT body 808 to the external environment, that is, to the exterior of the hydraulic cylinder.

Figure 10A:
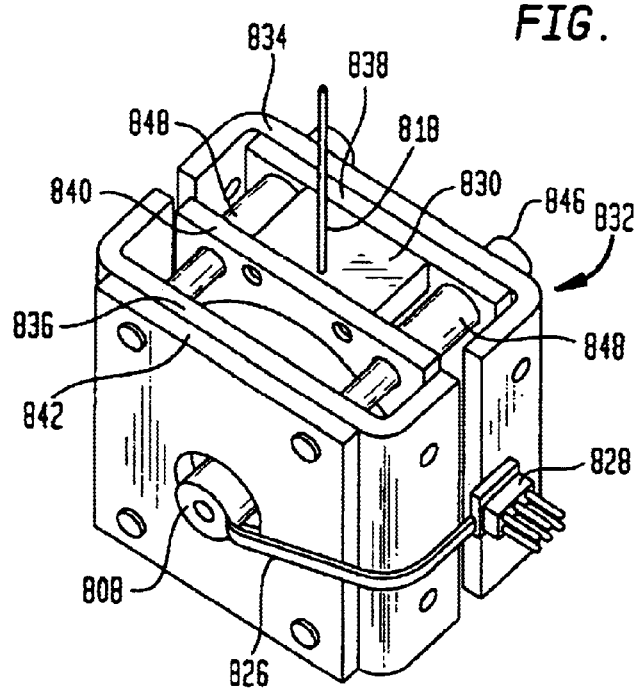
FIGS. 10A and 10B show a further exemplary embodiment according to the principles of the invention.
Figure 10B:
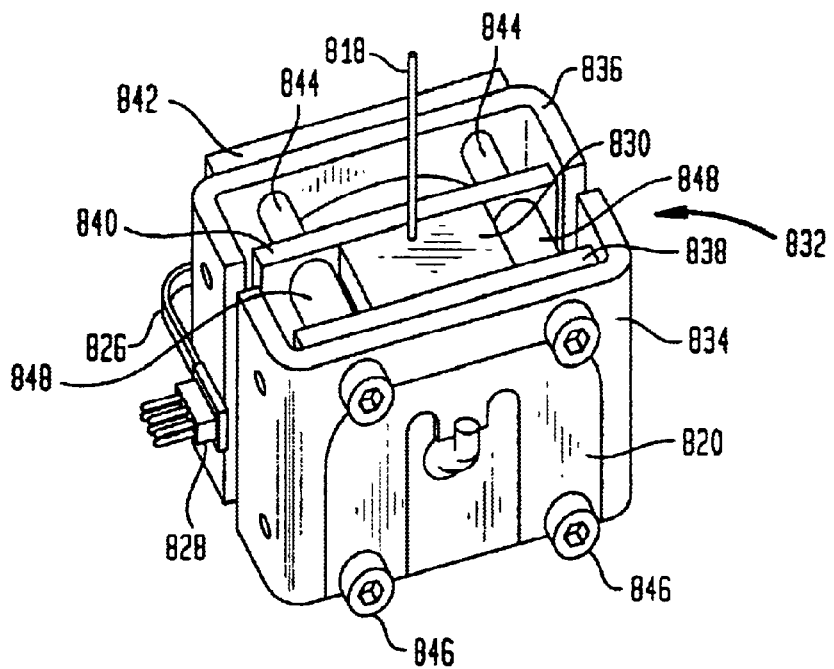

Turning now to FIGS. 10A and 10B, there are shown, perspective views, taken at differing angles, of a further stage in the construction of the overall sensor 830. In FIGS. 10A and 10B, the sensor 830 is constructed so as to be contained within a sensor frame 832 that is specially formed to be relatively easy and inexpensive to construct. Thus, the sensor frame 832 is made up of a plurality of stamped plates, among them, are a first U-shaped plate 834 and a second U-shaped plate 836, the orientation being that the extending legs of the U-shape configuration are directed toward each other to form an internal area between the respective first and second U-shaped plates 834 and 836, i.e. the first and second U-shaped plates 834 and 836 are turned inwardly to contain the sensor 830 therebetween. The further stamped plates include first, second and third flat plates, respectively, 838, 840 and 842, it being seen that the first flat plate 838 is positioned interiorly of the first U-shaped plate 834 and the third flat plate 842 is positioned exteriorly of the second U-shaped plate 836. The second flat plate 840 is located intermediate the first flat plate 838 and the second U-shaped plate 836, the purpose of the particular orientation of the plurality of stamped plates to be explained.

Initially, however, it should be pointed out that by the use of a plurality of plates in the construction of the sensor frame 832, the construction of the sensor frame 832 is greatly simplified over the use of custom machined components, that is, each of the plurality of stamped plates can readily be manufactured by conventional stamping techniques that are relatively simple to carry out and as will be seen, easy to assemble to provide the sensor frame 832 and securely mount the sensor 830, even in the particularly harsh environment within a hydraulic cylinder.

In addition, with the use of stamped plates, the particular dimensions of any or all of the plurality of stamped plates is easily facilitated to produce a sensor frame 832 having a wide variety of predetermined dimensions, and thus the technique using stamped plates is particularly adaptable to construct sensor frames having whatever overall dimensions are desired by the particular manufacturer by merely adjusting the stamping equipment to the predetermined dimensional configuration.

As can also be seen, the assembly of the sensor frame 832 is also a relatively easy method and which can be carried out inexpensively and rapidly. In this embodiment, the plurality of stamped plates are affixed together by means of threaded bolts 844 having bolt heads 846 that bear against the first U-shaped plate 834 and are threaded into suitable formed threads formed in the third flat plate 842 to sandwich the sensor 830 therebetween. The second flat plate 840 located in the intermediate position can be used to securely hold the sensor 830 in place and the lateral separation for the sensor 830 can be accurately spaced by providing spacers 848 in order to prevent damage to the sensor 830 as the threaded bolts 844 are tightened. Alternatively, of course, there can be nuts that are affixed to the ends of the threaded bolts 844 to carry out the assembly of the sensor frame 832 to provide a secure setting for the sensor 830. Other fasteners, such as rivets or the like, could also be used.

Figure 11:
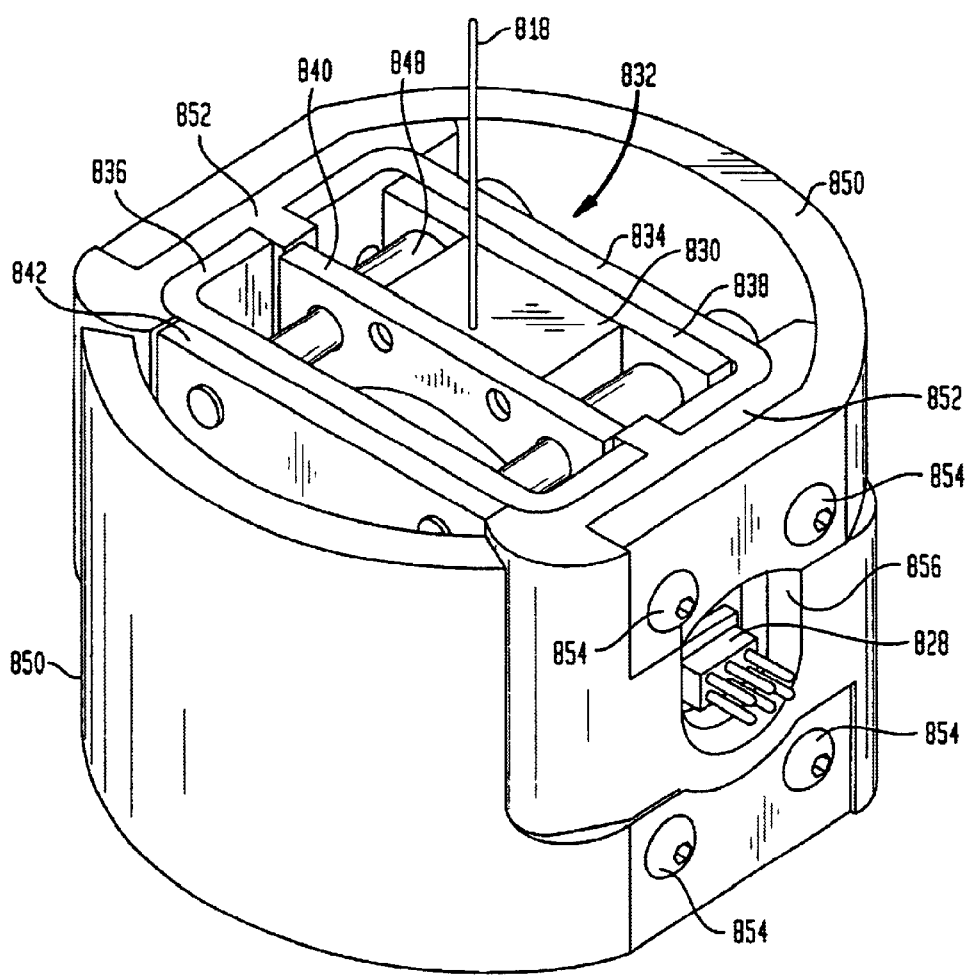
FIG. 11 shows a subassembly of an exemplary sensor according to the principles of the invention.

Next, in FIG. 11, there is shown a perspective view where additional components have been assembled to the subassembly of FIGS. 10A and 120B and where an enhanced feature has been included. That feature is provided by the addition of a pair of piston stops 850 that at least partially surround the sensor frame 832 and are dimensioned so as to have a predetermined height. It is preferable that the location of the sensor 830 be located with the hydraulic cylinder at the back end thereof and thus can be damaged or destroyed by the retraction of the pistol during the normal operation of that piston. With the piston stops 850, there is an assurance that, when installed within a hydraulic cylinder, the sensor 830 and the sensor frame 832 are protected from being engaged by the moving piston as it is retracted within the hydraulic cylinder toward the terminal end of its piston stroke. Turning briefly to FIG. 2, it can be seen that with the sensor 830 installed at the end of the hydraulic cylinder within which the piston moves, it is possible for the piston to inadvertently strike the sensor 830 at the end of the piston stroke and inflict damage to the sensor 830 if not protected in some manner.

Certainly, there can be some means of protection provided by the manufacturer of the hydraulic cylinder during its construction by adding some non-standard limiting feature to the travel of the piston, such as a stop or bumper, however, the manufacture of such hydraulic cylinders is well established and it would be considerably more difficult to have that manufacturer change the design of the hydraulic cylinder to accommodate a sensor according to the principles of the invention. Thus, with the use of the piston stops 850 that are constructed of a metal stampings, such as steel or other solid material, the piston will engage the piston stops 850 whereupon the stroke will be physically limited so as to prevent the piston from reaching the sensor 830 and damaging that sensor 830.

As shown, the piston stops 850, taken together, are formed as arcuate surfaces to fit complementarily within the hydraulic cylinder and the piston stops 850 can at least partially surround, and preferably substantially encircle, the sensor 830 and the sensor frame 832 in order to add to the structural integrity of the overall invention. Lesser degrees of encompassing the sensor 830 may be used, it only being of importance that the piston stops 850 have sufficient strength and integrity so as to prevent the piston from engaging the sensor 830 or the sensor frame 832. The use of the piston stops 850 can be an optional feature if other means are, of course, present to provide the needed protection to the sensor 830.

A pair of flexible end caps 852 are also shown in FIG. 11 and are located between the piston stops 850 and the sensor frame 832 and which provide a cushioning effect to the sensor frame 832 and, of course, also to the sensor 830. The flexible end caps 852 can be made of a resilient, flexible material, such as urethane, and the use of the flexible end caps 852 serves to mechanically isolate the sensor 830 from the usual shock and vibrations that inherently surround the hydraulic cylinders due to the atmosphere of the construction site where the hydraulic cylinders are intended for use. Again, the assembly of the piston stops 850 and the flexible end caps 852 is easily facilitated by bolts 854 that can be used to secure the piston stops 850 to the U-shaped plates 834 and 836. Also, a suitable opening 856 is formed in the flexible end caps 852 in order to have access to the LVTD male connector plug 828 for passing the signal from the sensor 830 to exterior of the hydraulic cylinder as will be explained.

Figure 12:
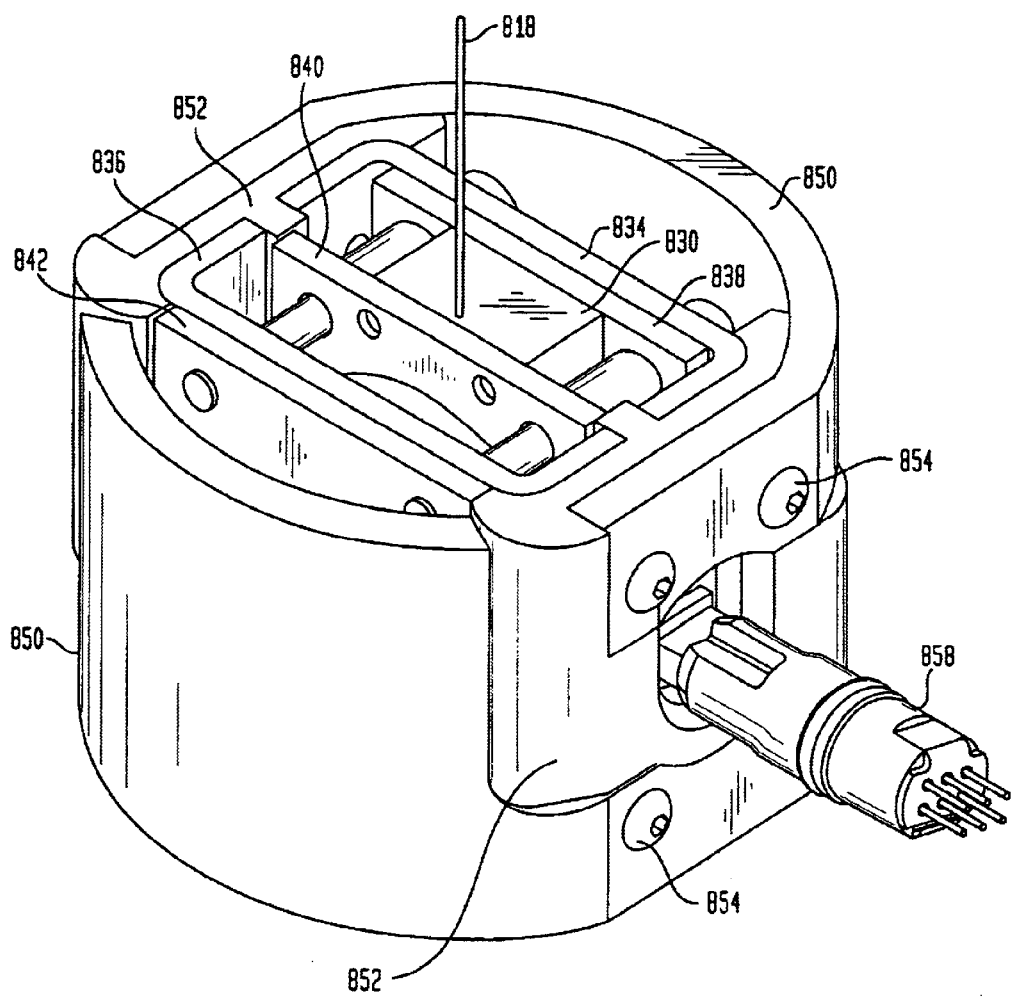
FIG. 12 shows an exemplary sensor according to the principles of the invention.

Turning briefly to FIG. 12, there is shown a perspective view of the assembly of FIG. 11 with the addition of a high pressure seal assembly 858 that is used to connect the sensor 830 electrically to an external location so that the signals from the sensor 830 can be accessed by the electronic equipment exterior to the hydraulic cylinder. Accordingly, the high pressure seal assembly 858 is used to electrically interconnect between the internal location of the sensor 830 within the high pressure hydraulic fluid and the external environment where the information is gleaned from the signals of the sensor 830.

Figure 13A:
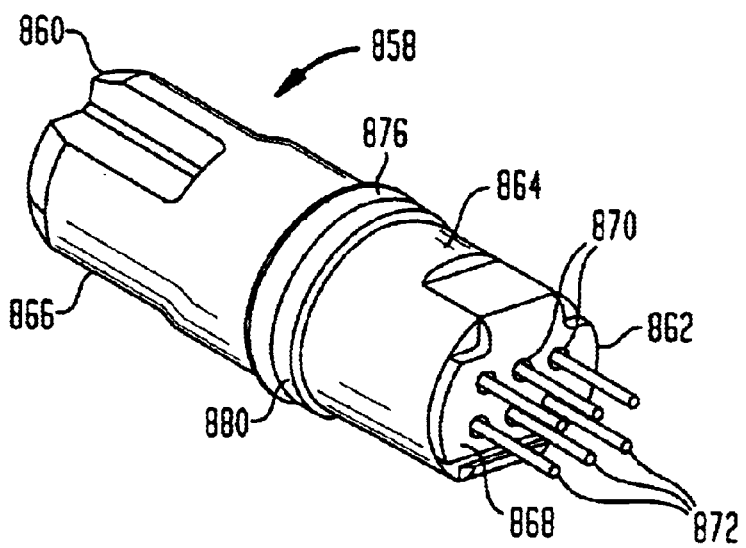
FIGS. 13A and 13B show an exemplary high-pressure seal assembly according to the principles of the invention.
Figure 13B:
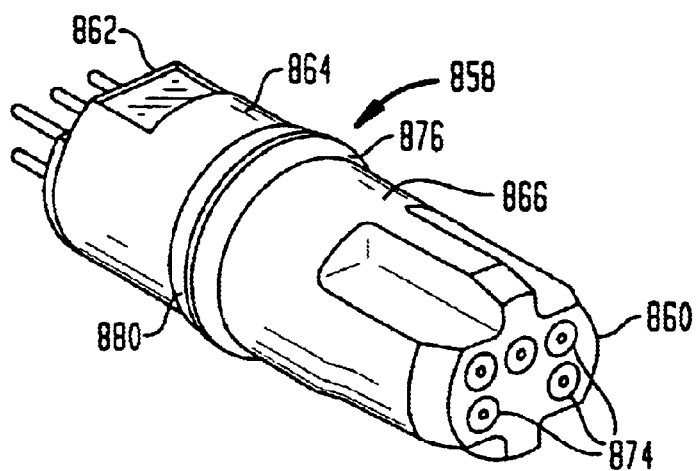

The construction and design of the high pressure seal assembly 858 is show in FIGS. 13A and 13B and which are perspective views of the high pressure seal assembly 858 showing the internal end 860 in FIG. 13B and the external end 862 in FIG. 13A. The high-pressure seal assembly 858 comprises a body 864 that may be constructed of a molded plastic material, a head 866 and an end cap 868. The end cap 868 has a plurality of aligned holes 870 through which protrude a plurality of conductive pins 872, that is, the conductive pins 872 extend outwardly from the external end 862 and thereby form a male connection to be available to be connected to a further female connector to transmit signals from the sensor 830 (FIG. 12) to an electronic circuit. As shown there are six conductive pins 872 that can be used, however, it may be preferred that a different number of pins be utilized, such as five pins, so that any external plug to be affixed to the conductive pins 872 can only have one usable orientation in carrying out that connection to the high pressure seal assembly 858. Obviously the actual number can be a lesser or greater number of conductive pins 872. Also, the seal can be one part, such as one plastic part.

At the internal end 860 of the high pressure seal assembly 858, there is a corresponding number of female connectors 874 and which are adapted to be oriented so as to be connectable to the LVTD male connector plug 828 of FIG. 11. An O-ring 876 is located along the outer peripheral surface of the high pressure seal assembly 858 to assist in forming the high pressure seal as will be later explained and an anti-extrusion ring 880 is provided at the intersecting junction of the body 864 and the head 866 of the high pressure seal assembly 858.

Figure 14:
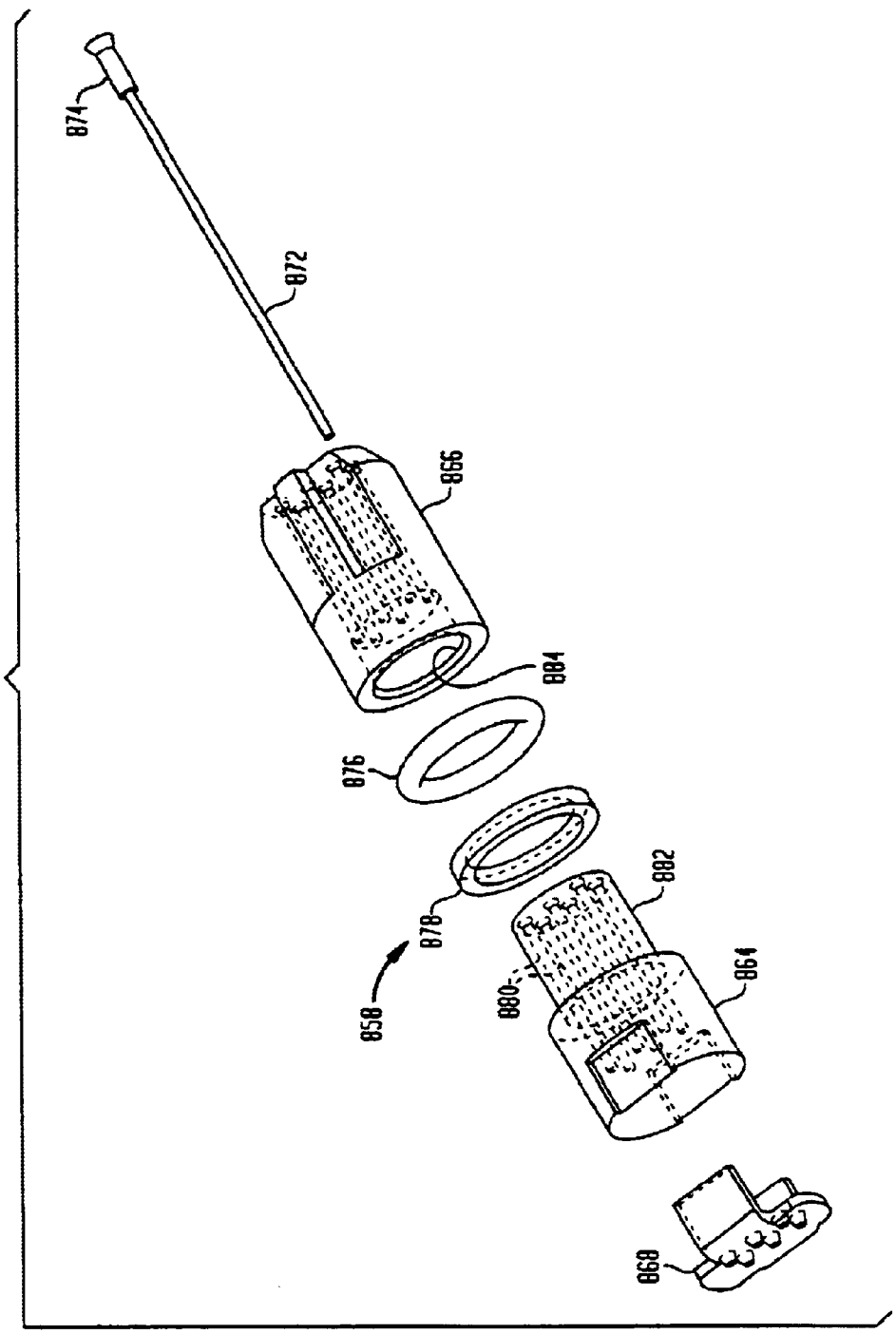
FIG. 14 shows an exemplary exploded view of the high pressure seal of FIGS. 13A and 13B according to the principles of the invention.

Turning now to FIG. 14, there is shown an exploded view of the high-pressure seal assembly 858 according to the principles of the invention and showing the internal components and construction. Thus, as can be seen, the conductive pins 872 are solid components that pass through both the head 866 and the body 864 to emerge and extend outwardly from the end cap 868. The female connectors 874 are affixed to the internal end of all of the conductive pins 872 as described. There are, of course cylindrical holes 880 formed in the body for passage of the conductive pins 872 therethrough and the body 864 also may include a reduced diameter end 882 that interfits into a suitably shaped opening 884 in the head 866 in an interference fit to solidly join those components firmly together. Intermediate the head 866 and the body 864, that is, at the junction thereof, there is provided the anti-extrusion ring 878 and the O-ring 876 to seal against the opening in the hydraulic cylinder when the high pressure seal assembly 858 is installed thereon.

The conductive pins 872 may be ultrasonically welded into the head 866 or insert molded therein to insure that the conductive pins 872 are fully sealed with the head 866 and to protect against any possible leakage along the conductive pins.

As can therefore now be appreciated, with the seal assembly 858, there is a conductive path from the sensor contained within the high pressure environment of the hydraulic cylinder where the sensor is located to the external environment outside of the hydraulic cylinder so that an external connector can pick up the signals. Yet, the construction of the high-pressure seal assembly 858 is relative easy to manufacture since the conductive pins 872 are solid and therefore the assemble does not have to deal with individual wires that normally require delicate handling. The techniques involved in assembling the seal assembly uses inexpensive conductors that are sealed into the thermoplastic material of the high pressure seal assembly 858 by ultrasonic swaging so that the plastic material actually melts around the conductive pins 872 or, as preferred, the conductive pins 872 are insert molded into the plastic material itself. In either case, the overall construction is relatively inexpensive and yet is effective to make the electrical interconnection between the high-pressure environment within the hydraulic cylinder to the ambient external environment. As will also be seen in the following explanation, an advantage of the seal assembly 858 is that it can be used with standard hydraulic cylinders and does not require any modifications to the commercial hydraulic cylinder itself.

Figure 15:
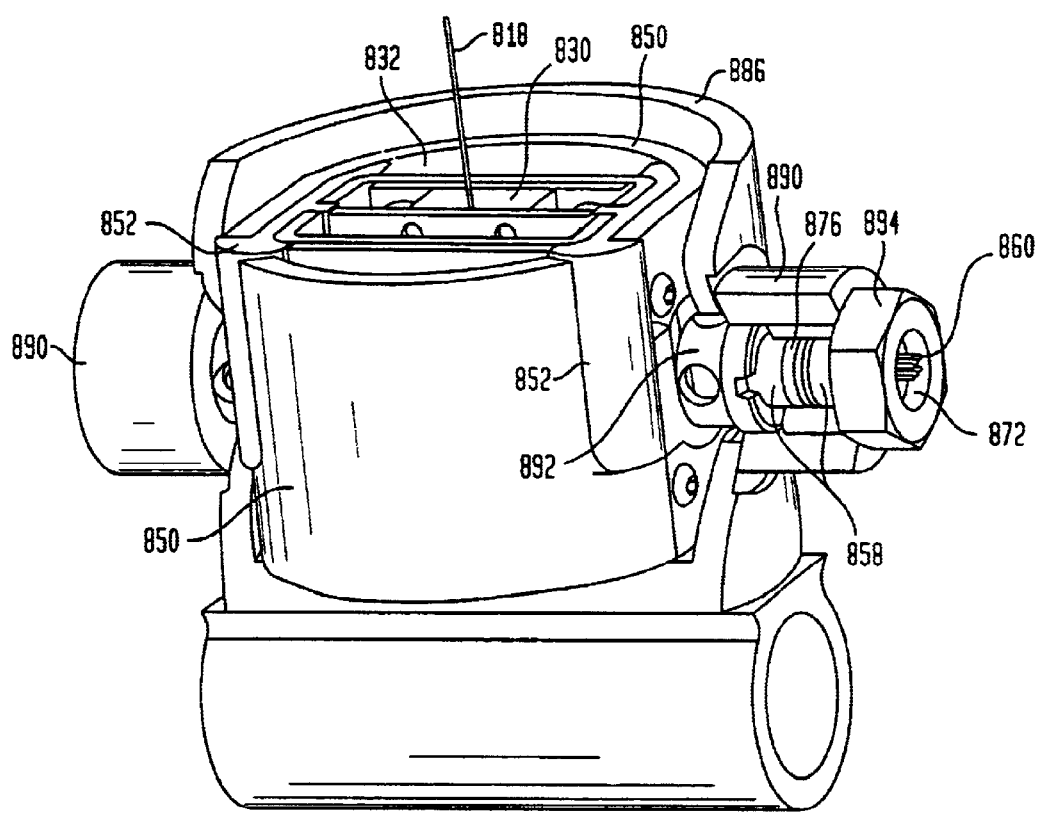
FIG. 15 shown an overall sensor contained with a hydraulic cylinder according to the principles of the invention.

Finally, in FIG. 15, there is shown a perspective view, partially cutaway, of a sensor according to the principles of the invention installed in a hydraulic cylinder 886. As can be seen, extending from the normal wall 888 of the hydraulic cylinder 886 is a hydraulic fluid port 890 through which the hydraulic fluid is supplied to the hydraulic cylinder 886 to cause the powered movement of the piston. There are, in the standard hydraulic cylinder 886 available today, normally two hydraulic fluid ports 890, oppositely disposed about the circular periphery of the hydraulic cylinder 886, that is, spaced about 180 degrees apart. As is normal, the hydraulic fluid may be introduced into the hydraulic cylinder 886 via either one of the hydraulic fluid ports, however, it is of importance herein that the hydraulic fluid ports 890 are basically standard on such hydraulic cylinders 886 and that the interior of such hydraulic fluid ports 890 are threaded so as to be connectable to the hoses supplying the hydraulic fluid. Again, therefore, it should be noted throughout the further description of the installation of a sensor 830 within a hydraulic cylinder 886, that a sensor according to the principles of the invention can be readily accomplished without modifications to the present commercially available hydraulic cylinders including not only the holding of the sensor frame 832 in a firm position, but also to the various interconnections and wiring to have the signal from that sensor 830 reach the external ambient environment at the external end 860 of the high pressure seal assembly 858 with the conductive pins 872 forming an external male connection.

As can be seen in FIG. 15, taken along with FIG. 11, there is a threaded port insert 892 that is threaded into the hydraulic fluid port 890, the threaded port insert 892 having external threads that mate with the normal internal threads of the hydraulic fluid port 890 so that the port insert 892 can be simply screwed into the hydraulic fluid port 890. Although only one port insert 892 is shown in FIG. 15, there are actually two of the port inserts 892 used, the other being screwed into the oppositely situated hydraulic fluid port 890, that is about 180 degrees separate from each other. By such means, the port inserts 892 are oppositely disposed about the hydraulic cylinder 886 and, as they are tightened, the internal ends of the port inserts 892 contact the flexible material of the flexible end caps 852 and the continued tightening or screwing of the port inserts 892 forcibly engages the sensor frame 832 to hold that sensor frame 832 firmly in position within the hydraulic cylinder 886. Thus, by simply coordinating the screwing or tightening of port inserts 892, the sensor frame 832 and, of course the sensor 830 held therein, can be firmly retained in the desired position within the hydraulic cylinder 886. The port inserts 892 themselves are hollow so that they do not interfere with the normal flow of hydraulic fluid at whichever hydraulic fluid port 890 is being used to supply and receive that hydraulic fluid for the operation and movement of the piston within the hydraulic cylinder 886.

Thus, the sensor frame 832 is firmly held in position, however, the intermediate layer of the flexible material that is caught between the port inserts 892 and the sensor frame 832 also serves to isolate the sensor 830 from the shock and vibration inherent in the typical atmosphere where the heavy construction equipment is typically being used.

As noted, since the port inserts 892 are hollow, one of the hydraulic fluid ports 890 can be used to locate and house a high pressure seal assembly 858 in order to provide an external connection ultimately to the sensor 830 within the interior of the hydraulic cylinder 886. Accordingly, as shown, the high pressure seal assembly 858 is inserted into a hydraulic fluid port 890 and is held therein by means of a retaining fitting 894 so that the high pressure seal assembly 858 is held within the hydraulic fluid port 890 and the O-ring 876 can seal against the internal surface of the retaining fitting 894 to prevent leakage from the high pressure interior environment of the hydraulic cylinder 886.

It is to be understood that the invention is not limited to the illustrated and described forms of the invention contained herein. It will be apparent to those skilled it the art that various changes may be made without departing for the scope of the invention and the invention is not considered limited to what is shown in the drawings and described in the specification.

What is claimed is:

1. A cylinder comprising a piston and a sensor operable to provide a position-related signal for the piston; the sensor including:

a flexible connector having a first end attached to the piston;

a converting element attached to the cylinder and coupled to a second end of the flexible connector; the converting element having a rotating element operable to rotate in dependence on movement of the piston;

a translating member cooperating with the rotating element, wherein the translating member linearly displaces upon rotation of the rotating element and wherein the translating member displaces proportionally to displacement of the piston; and a transducer disposed to sense the translating member, wherein the rotating element defines an interior periphery, the translating member being disposed in the interior.

2. The cylinder of claim 1 wherein the transducer is disposed in a working fluid of the cylinder.

3. A method for sensing a position of a first element moveable within a cylinder, the steps comprising:

in a converting element in fixed relation to the cylinder, converting a linear displacement of the first element to a proportional linear displacement of a second element via a flexible connector connected to the first element and to the converting element;

disposing a transducer within the cylinder; and sensing the linear displacement of the second element with the transducer.

4. The method claim 3 wherein the converting step includes the steps of:

converting the linear displacement of the first element to an angular displacement of a rotatable element; and converting the angular displacement of the rotatable element to the proportional linear displacement of the second element.

5. The method of claim 3 wherein the transducer comprises an LVDT.

6. The method of claim 3 wherein the transducer is operable to provide a position-related signal.

7. The method of claim 3 further comprising the step of disposing hydraulic fluid within said cylinder so that the transducer operates in the hydraulic fluid.

8. A sensor for providing a position-related signal for a first element in relation to a second element, the sensor comprising:

a flexible connector having a first end attachable to the first element;

a rotating element attachable to the second element and coupled to a second end of the flexible connector;

a translating member cooperating with the rotating element; and a transducer disposed to sense a position of the translating member, wherein the transducer provides the position-related signal, wherein the rotating element defines an interior periphery, the transducer being at least partially disposed within the interior periphery.

9. A cylinder comprising a piston and a sensor operable to provide a position-related signal for the piston; the sensor including:

a flexible connector having a first end attached to the piston;

a converting element attached to the cylinder and coupled to a second end of the flexible connector; the converting element having a rotating element operable to rotate in dependence on movement of the piston;

a translating member cooperating with the rotating element, wherein the translating member linearly displaces upon rotation of the rotating element; and a transducer disposed to sense the translating member wherein the converting element comprises a rotating element defining an interior periphery, the transducer being at least partially disposed within the interior periphery.

10. A sensor comprising:

a connector;

a rotating element defining an interior periphery and arranged to rotate in cooperation with a moveable element via the connector; and an LVDT transducer disposed axially within the interior periphery, the LVDT transducer having a translating member in cooperation with the rotating element, wherein the translating member linearly displaces proportionally to a linear displacement of the moveable element, wherein the LVDT transducer is disposed to sense the linear displacement of the moveable element.

11. The sensor of claim 10 wherein the connector is a flexible connector.

* * * * *